Figure 1:
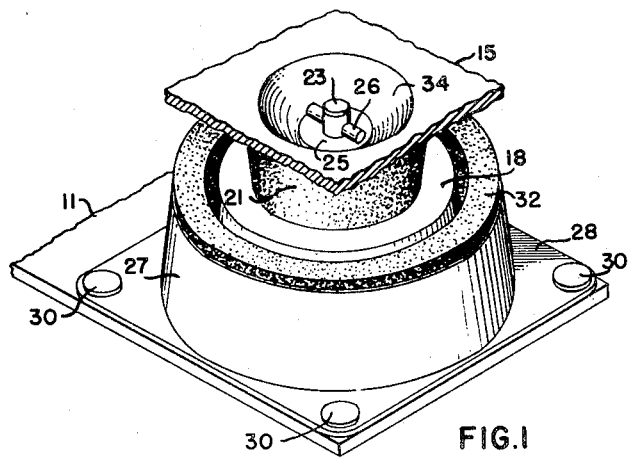

Dec. 21, 1948.  J. MARKOWITZ  2,457,058

SUPPORTING ARRANGEMENT

Filed Sept. 5, 1945

INVENTOR.
JESSE MARKOWITZ
BY Harry C. Page
ATTORNEY

Patented Dec. 21, 1948

2,457,058

UNITED STATES PATENT OFFICE 2,457,058

SUPPORTING ARRANGEMENT

Jesse Markowitz, Forest Hills, N. Y., assignor, by mesne assignments, to Hazeltine Research, Inc., Chicago, Ill., a corporation of Illinois Application September 5, 1945, Serial No. 614,542

13 Claims. (Cl. 248—24)

1

This invention relates to arrangements for yieldably supporting one object with reference to a second, and more particularly is directed to vibration and shock-absorbing mountings which may be employed to support communication equipment on airplanes and in other installations for reducing the vibration and shock transmitted to electronic components.

A specific application of the invention contemplates a mounting which may be used in an airplane or other installation where the object to be supported may be disposed at a position which differs considerably from the normal mounting plane.

Many types of shock-absorbing mountings have heretofore been designed and used. Generally, each structure has been designed for a particular application and the resilient units and methods of suspension have varied accordingly. A number of prior art structures employ a series of resilient units, so arranged as to present a yieldable support both towards and away from the supporting object. These units, however, do not employ a nested structure and occupy considerable space. Other designs use nested resilient units but are capable of resilient support in one direction only.

It is an object of the present invention, therefore, to provide a supporting arrangement which avoids one or more of the aforementioned limitations of prior arrangements.

It is another object of the invention to provide an improved arrangement for yieldably supporting a first object with reference to a second object.

Another object of the invention is to provide an improved arrangement for yieldably supporting an object regardless of the position of the supporting object.

Another object of the invention is to provide an improved supporting arrangement which includes at least two resilient units arranged in nested relation to afford a high degree of vibration damping in a unit of reduced physical size.

Another object of the invention is to provide a supporting arrangement which has a variable stiffness in the yielding resilient units in accordance with the amount of relative motion between the supported object and the supporting object.

Another object of the invention is to provide an improved supporting arrangement with high internal damping action for rapidly damping free vibrations produced by shock and for limiting the magnitude thereof at resonance.

In accordance with the invention an arrangement for yieldably supporting a first object with reference to a second object comprises a first resilient member to be supported at one of its ends on the second of the objects. A second resilient member is assembled in partially nested relation with respect to the opposite end of the first resilient member and has a free end for receiving the first of the objects. A separator is disposed between the first and second resilient members. The arrangement also includes means for engaging the first resilient member in the vicinity of the aforesaid one end thereof and for engaging the first or supported object. A stop means is provided for limiting the motion of the separator in a direction away from the supporting object.

For a better understanding of the present invention, together with other and further objects thereof, reference is had to the following description taken in connection with the accompanying drawing, and its scope will be pointed out in the appended claims.

Figure 2:
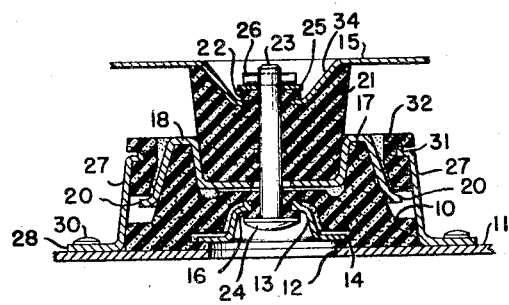
Figure 3:
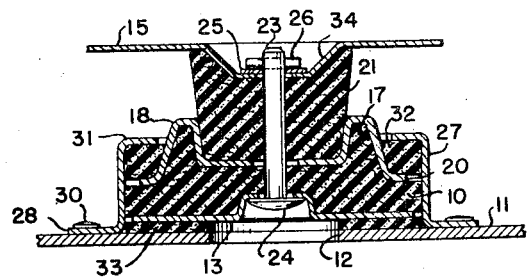

In the accompanying drawing, Fig. 1 is an isometric view of one form of an arrangement embodying the invention for yieldably supporting a first object with reference to a second object; Fig. 2 is a vertical sectional view of the arrangement of Fig. 1; and Fig. 3 is a vertical sectional view of an alternative form of the Fig. 1 arrangement.

Referring now to the drawing, Figs. 1 and 2 represent an arrangement for yieldably supporting a first object with reference to a second object. A fragmentary portion 15 of the first object is illustrated, this portion may be considered to be part of the base member of a communications equipment unit desired to be yieldably mounted on a second object or supporting member 11. The supporting arrangement comprises a first resilient member 10, supported on a flat portion of the supporting object 11. The supporting object is formed with a hole 12 to assist in assembly.

The first resilient member 10 is concentrically positioned with the hole 12 and has a recessed portion adjacent to the hole in which a thrust plate 13 resiliently engages the first resilient member by means of a groove 14. The thrust plate may be made flat but to save space and to obtain a strong structural unit, it is formed with a recessed portion as illustrated. At the center of the thrust plate a portion of the first resilient member 10 extends through a hole in the plate and a ring of resilient material surrounds the edge of the hole to form a grommet-like portion 16.

The groove 14 and the cutout portions of member 10 are made larger than necessary to accommodate the thrust plate 13 and for this reason a space exists above the plate, extending over its entire area except at the edge of the hole where the plate has a thick bead-like portion that completely fills the space under the grommet extension 16.

At the other end of the first resilient member 10 an annular extension 17 surrounds a centrally located recessed portion which is utilized to assemble the components of the arrangement in a nested relation. A hole is provided in the center of member 10, also for assembly purposes.

Adjoining the first resilient member 10 on the opposite end from the portion in contact with the supported object is a separator or a plate 18, conforming generally to the shape of the member 10. The central part of the plate 18 is flat and is provided with a hole in the center of the flat portion for assembly purposes. Adjoining the central portion is an annular corrugation which is made to conform to the annular extension 17 of the first resilient member 10. At the periphery of the separator plate a flange 20 is provided, the functions of which will be explained hereinafter.

The separator plate is made with such configuration as to fit over the surface of the first resilient member in exact contour except at the central flat section where it is spaced a predetermined distance from the recessed portion of the first resilient member. This intervening space has a definite and important bearing on the performance of the resilient arrangement and will be explained hereinafter.

A second resilient member 21, having a cylindrical form, is mounted concentrically with the separator plate in partially nested relation therewith, fitting into the centrally located recess portion formed in the separator plate by reason of the conformity of the plate with the first resilient member. The free end of the second resilient member is suitably shaped to receive and support the supported object 15. To this end, a hole is formed in the central part of the member 21 and a cone-shaped cavity 34 is formed in the free end thereof to co-operate with a similar formation on the supported object 15. The central end portion of the second resilient member has a grommet-like extension 22 similar to the extension 16 on the first resilient member 10 and this extension is shaped to surround and resiliently hold the edges of a hole in object 15.

A pin 23 is utilized to hold the above-described components together. It projects through the central holes in the first and second resilient members 10 and 21 and through the separator plate 18. The pin also holds the several components in alignment and is an important factor when a shearing or transverse stress is encountered. At the lower end of the pin a bolt head 24 engages the grommet-like extension of the first resilient member 10 while at the upper end of the pin a washer 25 and a key pin 26 are removably secured to engage the grommet-like extension of the second resilient member 21.

The pin 23 is made somewhat shorter than required by the uncompressed distance between the extremities of the two grommet-like extensions. Then, when the unit is assembled, the two resilient members are precompressed to some extent, a condition which improves the internal damping factor.

It will be evident from the above description that the pin which holds the main components together does not make metallic contact with either the first or second object nor the thrust plate. It is therefore a "floating" structural unit, the advantages of which will become apparent when the operation of the device is described.

A stop means for limiting the motion of the separator plate 18 in a direction away from the second object comprises a cylindrical casing 27 having flanged portions 28. The casing is to be secured to the second or supporting object 11 by rivets 30 or other suitable fastening means. The free or upper end of the casing is turned over, thereby forming an inwardly extending flange 31 which is utilized to hold or otherwise secure a resilient ring member 32. The ring member engages the flange portion 20 of the separator plate when a force tends to move the first object 15 or supported unit in a direction away from the second object 11 or base upon which the unit 15 is supported, and it engages the sloping side of the separator plate when a force tends to move the first object or supported unit in a direction parallel to the plane of the second object or base.

The resilient ring member 32 is mounted in spaced relation with respect to the peripheral portion 20 of the separator plate so that a definite increment of motion must first be effected before engagement takes place.

When the supporting arrangement is in operation, three or more mounts are usually employed to hold the supported object 15 resiliently so that the plane of the supported object is substantially parallel to the plane of the supporting object or base 11. If, now, a force tends to move the supported object toward the base, the resilient members 10 and 21 are jointly compressed in series, the first member 10 because of pressure exerted between the separator plate and the base 11, and the second member 21 is compressed because of the pressure exerted between the supported object 15 and the separator plate 18. The two compressive actions outlined above are in series and the total displacement of the supported object toward the base 11 is equal to the sum of the movements of each of the resilient memebrs.

If a force is applied which tends to separate the two objects 11 and 15 in a direction parallel to pin 23, the second resilient member 21 is under no added stress and, except for the grommet-like extension 22, the second resilient member will not function as a resilient mount. Under the condition assumed, the pin 23 is forced upward and lifts thrust plate 13 thereby compressing the first resilient member 10 between the thrust plate and the separator plate and also compressing the resilient ring member 32 between the peripheral flange 20 and the flanged portion 31 of the cylindrical casing 27. The above action is a series compression of two resilient units in nested relation in the same manner as the action which resulted when the two objects were forced together.

If a transverse force is applied to the supported object 15, which tends to move it in a direction at right angles to the axis of the pin 23, all three resilient members are compressed or deformed. The action of the first resilient member 10 consists of a shearing strain, which tilts the pin 23, and a compression of the nested part against the side wall of the recessed portion of plate 18. The transverse pressure against the plate 18 results in a small deformation of the first resilient member 10 but most of the transverse thrust is exerted upon the resilient ring member 32 which is compressed between the side walls of the cylindrical casing and the separator plate 18.

The supporting arrangement shown in Fig. 2 is especially suited to support communication equipment because the stiffness factor is quite small for small vibrational forces. This characteristic is obtained in part by the use of the above-mentioned air spaces between elements. For example, when a force is applied to the supported object which tends to move it toward the base, the first increment of motion compresses the second resilient member 21 and that part of the first resilient member 10 which lies below the annular extension 17. After the movement has progressed to an extent where the separator plate is in contact with the top portion of the centrally located recessed area of the first resilient member 10 any further movement in the same direction must be accompanied by an additional compression of the central part of the first resilient member. A further movement collapses the space between the thrust plate 13 and the adjacent surface of the first resilient member and thereafter any additional motion must compress the resilient material between the thrust plate 13 and the base 11.

It is evident from the above description that the stiffness factor is at a low value when vibratory movements are small. As the movements increase in magnitude the stiffness factor becomes quite large thereby producing a "snubbing" action which materially reduces large vibrations and efficiently cushions severe shocks.

The same change-of-stiffness characteristic exists when a force tends to separate the supported object and the base. During the first small increment of motion the peripheral flange 20 moves toward the resilient ring member 32 and makes contact therewith. Subsequent separation causes the space between the thrust plate and the adjacent surface to collapse and after still further separation the space between the separator plate and the adjacent surface of the first resilient member 10 collapses.

The above description of the operation has been directed to the condition wherein the supporting arrangement is in an upright position as indicated by the drawing and the force of gravity operates in a direction to force the supported object and the supporting object toward each other. If this condition is reversed, the operation will be the same except that the force of gravity will be added to the vibrational forces which tend to separate the objects rather than move them together. Such a reversal does not alter the results.

The construction of the supporting arrangement shown in Fig. 3 is generally similar to that of Fig. 2 and similar reference characters are used to designate similar parts. No air spaces have been built into the alternate form because the arrangement shown in Fig. 3 has been devised to support heavier objects. The recessed thrust plate 13 is larger than the similar plate shown in Fig. 2 and a separate resilient member 33 is positioned between it and the supporting object 11.

The pin 23 (Fig. 3) is mounted with its retaining means 24 and 25 in direct contact with the associated supported object 15 and plate 13. This form of assembly permits the resilient members to be precompressed to a greater degree than if ring washers of resilient material are used at the ends of the pin as shown in Fig. 2. The operation of the supporting arrangement shown in Fig. 3 is generally the same as the arrangement shown in Fig. 2.

The resilient members described above may be made of any suitable material having the adequate amount of flexibility and internal damping. For lightweight units sponge rubber may be used. For heavy units the resilient members may be made of solid rubber which has the configuration necessary to control the resilience of the members in the vertical and radial directions.

The use of rubber may be dispensed with entirely and replaced by resilient pads made of matted or woven wire. Fine steel wire, when knitted or woven to form a tape and then wound into a cylindrical pad, possesses all the properties necessary for a resilient member of the type used in the above-described supporting arrangements.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An arrangement for yieldably supporting a first object with reference to a second object comprising, a first resilient member to be supported at one end on the second of said objects, a second resilient member in partially nested relation with respect to the opposite end of said first resilient member and having a free end for receiving the first of said objects, a separator disposed between said first and second resilient members, a pin projecting through said resilient members and said separator for aligning said resilient members having retaining means at one end for engaging said first resilient member in the vicinity of said one end thereof and having retaining means at the other end for engaging said first object, and stop means for limiting the motion of said separator in a direction away from said second object.

2. An arrangement for yieldably supporting a first object with reference to a second object comprising, a first resilient member to be supported at one end on the second of said objects, a second resilient member in partially nested relation with respect to the opposite end of said first resilient member and having a free end for receiving the first of said objects, a separator disposed between said first and second resilient members, a pin projecting through said resilient members and said separator for aligning said resilient members having retaining means at one end for engaging said first resilient member in the vicinity of said one end thereof and having retaining means at the other end for engaging said first object, and stop means to be secured to said second object for limiting the motion of said separator in a direction away from said second object.

3. An arrangement for yieldably supporting a first object with reference to a second object comprising, a first resilient member to be supported at one end on the second of said objects, a second resilient member in partially nested relation with respect to the opposite end of said first resilient member and having a free end for receiving the first of said objects, a separator disposed between said first and second resilient members and having a portion enclosing at least part of the outer one of said resilient members, a pin projecting through said resilient members and said separator for aligning said resilient members having retaining means at one end for engaging said first resilient member in the vicinity of said one end thereof and having retaining means at the other end for engaging said first object, and stop means for limiting the motion of said separator in a direction away from said second object.

4. An arrangement for yieldably supporting a first object with reference to a second object comprising, a first resilient member to be supported at one end on the second of said objects, a second resilient member in partially nested relation with respect to the opposite end of said first resilient member and having a free end for receiving the first of said objects, a separator having a flanged periphery and disposed between said first and second resilient members, a pin projecting through said resilient members and said separator for aligning said resilient members having retaining means at one end for engaging said first resilient member in the vicinity of said one end thereof and having retaining means at the other end for engaging said first object, and a stop means including a resilient ring member for engagement with said separator flange for limiting the motion of said separator in a direction away from said second object.

5. An arrangement for yieldably supporting a first object with reference to a second object comprising, a first resilient member to be supported at one end on the second of said objects, a second resilient member in partially nested relation with respect to the opposite end of said first resilient member and having a free end for receiving the first of said objects, a separator having a flanged periphery and disposed between said first and second resilient members, a pin projecting through said resilient members and said separator for aligning said resilient members having retaining means at one end for engaging said first resilient member in the vicinity of said one end thereof and having retaining means at the other end for engaging said first object, and stop means including a cylindrical casing and a resilient ring member enclosed by said casing for engagement with said separator flange for limiting the motion of said separator in a direction away from said second object.

6. An arrangement for yieldably supporting a first object with reference to a second object comprising, a first resilient member to be supported at one end on the second of said objects, a second resilient member in partially nested relation with respect to the opposite end of said first resilient member and having a free end for receiving the first of said objects, a separator disposed between said first and second resilient members and having a flanged peripheral portion shaped to enclose at least part of the outer one of said resilient members, a pin projecting through said resilient members and said separator for aligning said resilient members having retaining means at one end for engaging said first resilient member in the vicinity of said one end thereof and having retaining means at the other end for engaging said first object, and stop means including a cylindrical casing to be secured to said second object and a resilient ring member enclosed by said casing for engagement with said peripheral portion of said separator for limiting the motion of said separator in all directions except in the direction toward said second object.

7. An arrangement for yieldably supporting a first object with reference to a second object comprising, a first resilient member to be supported at one end on the second of said objects, a second resilient member in partially nested relation with respect to the opposite end of said first resilient member and having a free end for receiving the first of said objects, a separator disposed between said first and second resilient members, a pin projecting through said resilient members and said separator for aligning said resilient members having retaining means at one end for engaging said first resilient member in the vicinity of said one end thereof and having retaining means at the other end for engaging said first object, a thrust plate resiliently engaging said first resilient member in the vicinity of one end thereof, said first resilient member including a ring of resilient material disposed between said thrust plate and said retaining means at one end of said pin, said second resilient member including a ring of resilient material disposed between said first object and said retaining means at the other end of said pin, and stop means for limiting the motion of said separator in a direction away from said second object.

8. An arrangement for yieldably supporting a first object with reference to a second object comprising, a first resilient member to be supported at one end on the second of said objects, a second resilient member in partially nested relation with respect to the opposite end of said first resilient member and having a free end for receiving the first of said objects, a separator disposed between said first and second resilient members, a thrust plate resiliently engaging said first resilient member in the vicinity of said one end thereof, a pin projecting through said resilient members, said separator and said thrust plate for aligning said resilient members and said thrust plate and having retaining means at one end for engaging said thrust plate and having retaining means at the other end for engaging said first object, and stop means for limiting the motion of said separator in a direction away from said second object.

9. An arrangement for yieldably supporting a first object with reference to a second object comprising, a first resilient member to be supported at one end on the second of said objects and having a centrally located recessed portion at its other end, a second resilient member in partially nested relation with respect to said recessed portion of said first resilient member and having a free end for receiving the first of said objects, a separator disposed between said first and second resilient members having such configuration as to be spaced a predetermined distance from said recessed portion of said first resilient member, a pin projecting through said resilient members and said separator for aligning said resilient members having retaining means at one end for engaging said first resilient member in the vicinity of said one end thereof and having retaining means at the other end for engaging said first object, and stop means for limiting the motion of said separator in a direction away from said second object.

10. An arrangement for yieldably supporting a first object with reference to a second object comprising, a first resilient member to be supported at one end on the second of said objects, a second resilient member in partially nested relation with respect to the opposite end of said first resilient member and having a free end for receiving the first of said objects, a saparator disposed between said first and second resilient members and having a flanged peripheral portion shaped to enclose at least part of said first resilient member, a pin projecting through said resilient members and said separator for aligning said resilient members having retaining means at one end for engaging said first resilient member in the vicinity of said one end thereof and having retaining means at the other end for engaging a portion of said first object, and stop means including a cylindrical casing to be secured to said second object and a resilient ring member supported by said cylindrical casing in spaced relation with respect to said peripheral portion of said separator for limiting the motion of said separator in all directions except in the direction toward said second object.

11. An arrangement for yieldably supporting a first object with reference to a second object comprising, a first resilient member to be supported at one end on the second of said objects, a second resilient member in partially nested relation with respect to the opposite end of said first resilient member and having a free end for receiving the first of said objects, a separator disposed between said first and second resilient members, a thrust plate resiliently supported by said first resilient member in the vicinity of said one end thereof in spaced relation to said second object, a pin projecting through said resilient members, said separator and said thrust plate for aligning said resilient members and said thrust plate, said pin having retaining means at one end for engaging said thrust plate and having retaining means at the other end thereof for engaging said first object, and stop means for limiting the motion of said separator in a direction away from said second object.

12. An arrangement for yieldably supporting a first object with reference to a second object comprising, a first resilient member to be supported at one end on the second of said objects, a second resilient member in partially nested relation with respect to the opposite end of said first resilient member and having a free end for receiving the first of said objects, a separator disposed between said first and second resilient members, means for engaging said first resilient member in the vicinity of said one end thereof and for engaging said first object, and stop means for limiting the motion of said separator in a direction away from said second object.

13. An arrangement for yieldably supporting a first object with reference to a second object comprising, a first resilient member to be supported at one end on the second of said objects, a second resilient member in partially nested relation with respect to the opposite end of said first resilient member and having a free end for receiving the first of said objects, a separator disposed between said first and second resilient members, a pin having retaining means at one end for engaging said first resilient member in the vicinity of said one end thereof and having retaining means at the other end for engaging said first object, and stop means for limiting the motion of said separator in a direction away from said second object.

JESSE MARKOWITZ.

REFERENCES CITED

The following references are of record in the file of this patent:

UNITED STATES PATENTS

| Number | Name | Date |
|---|---|---|
| 2,076,034 | Lampman | Apr. 6, 1937 |